US012579472B2

(12) United States Patent
Fan et al.

(10) Patent No.: US 12,579,472 B2
(45) Date of Patent: Mar. 17, 2026

(54) DATA PROCESSING METHOD, APPARATUS, AND DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Xiaoliang Fan, Shenzhen (CN); Yangyu Tao, Shenzhen (CN); Jie Jiang, Shenzhen (CN); Yuhong Liu, Shenzhen (CN); Peng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 762 days.

(21) Appl. No.: 18/073,333

(22) Filed: Dec. 1, 2022

(65) Prior Publication Data

US 2023/0100679 A1    Mar. 30, 2023

Related U.S. Application Data

(63) Continuation of application No. PCT/CN2022/078282, filed on Feb. 28, 2022.

(30) Foreign Application Priority Data

Mar. 10, 2021    (CN) .......................... 202110258944.9

(51) Int. Cl.
*G06N 20/00* (2019.01)
*G06F 16/22* (2019.01)

(52) U.S. Cl.
CPC ......... *G06N 20/00* (2019.01); *G06F 16/2272* (2019.01)

(58) Field of Classification Search
CPC .......... G06N 20/00; G06N 3/00; G06F 16/00; G06F 21/00
See application file for complete search history.

(56) References Cited

U.S. PATENT DOCUMENTS

2020/0111022 A1* 4/2020 Silberman .............. G06N 3/044

FOREIGN PATENT DOCUMENTS

CN     111242244 A     6/2020
CN     111507479 A     8/2020
(Continued)

OTHER PUBLICATIONS

The World Intellectual Property Organization (WIPO) International Search Report for PCT/CN2022/078282 May 30, 2022 7 Pages (including translation).
(Continued)

*Primary Examiner* — Maryam A Nasri

(74) *Attorney, Agent, or Firm* — Anova Law Group, PLLC

(57) ABSTRACT

This application provides a federated-learning-based data processing method, apparatus, and device, and a computer-readable storage medium. The method includes obtaining data to be processed, the data to be processed comprising multiple object identifiers and a feature value corresponding to each object identifier; binning the data to be processed based on the feature value corresponding to each object identifier to obtain a number of bins; determining multiple target identifier sets from each bin, and transmitting each target identifier set to a label-party device; receiving each piece of set label distribution information corresponding to each target identifier set from the label-party device, and determining bin label distribution information corresponding to each bin based on each piece of set label distribution information; and merging bins based on a binning policy and (Continued)

each piece of bin label distribution information to obtain a
final binning result.

20 Claims, 9 Drawing Sheets

(56)                    References Cited

FOREIGN PATENT DOCUMENTS

| | | | |
|----|----------------|----|---------|
| CN | 111523679  | A | 8/2020 |
| CN | 111539535  | A | 8/2020 |
| CN | 112632045  | A | 4/2021 |
| WO | 2020177475 | A1 | 9/2020 |

OTHER PUBLICATIONS

Tanmc123, "Hetero Feature Binning", May 1, 2020, https://github.
com/FederatedAl/FATE/tree/v1.4.0/federatedml/feature.
The European Patent Office (EPO) The Extended European Search
Report for 22766174.1 Mar. 25, 2024 10 Pages.

* cited by examiner

Label-party device 200

Memory 250

| Operating system 251 |
| Network communication module 252 |
| Display module 253 |
| Input processing module 254 |
| Data processing apparatus 255 |

Network interface 220

Processor 210

240

User interface 230

Output unit 231

Input unit 232

Second receiving module 2551

Second obtaining module 2552

First determining module 2553

Second transmission module 2554

DATA PROCESSING METHOD, APPARATUS, AND DEVICE, COMPUTER-READABLE STORAGE MEDIUM, AND COMPUTER PROGRAM PRODUCT

RELATED APPLICATIONS

This application is a continuation of PCT Application No. PCT/CN2022/078282, filed on Feb. 28, 2022, which claims priority to Chinese Patent Application No. 202110258944.9 filed on Mar. 10, 2021. The two applications are incorporated herein by reference in their entirety.

FIELD OF THE TECHNOLOGY

This application relates to artificial intelligence technologies, and particularly to a data processing method, apparatus, and device, a computer-readable storage medium, and a computer program product.

BACKGROUND OF THE DISCLOSURE

A federated learning technology is an emerging privacy protection technology capable of effectively co-training a model by use of data of all participants while keeping the data within local domains.

Longitudinal federated learning usually co-trains a machine learning model by different participants. Optimal binning, as very common model binning, is widely used in a feature engineering stage before machine learning modeling. Binned data may improve model effects well. Such a nonlinear binned model has a natural ability of segmenting continuous features, and discretizes the features using segmentation points. However, due to the independent storage and maintenance of data between different companies and between difference departments, "data islands" are gradually formed. It is a challenge to implement secure and efficient joint binning between data islands.

SUMMARY

Embodiments of this application provide a data processing method and apparatus, a computer-readable storage medium, and a computer program product, which may improve the data security.

The technical solutions of the embodiments of this application are implemented as follows.

The embodiments of this application provide a data processing method, applied to a feature-party device. The method includes obtaining data to be processed, the data to be processed comprising multiple object identifiers and a feature value corresponding to each object identifier; binning the data to be processed based on the feature value corresponding to each object identifier to obtain a number of bins; determining multiple target identifier sets from each bin, and transmitting each target identifier set to a label-party device; receiving each piece of set label distribution information corresponding to each target identifier set from the label-party device, and determining bin label distribution information corresponding to each bin based on each piece of set label distribution information; and merging bins based on a binning policy and each piece of bin label distribution information to obtain a final binning result.

The embodiments of this application provide a federated-learning-based data processing method, applied to a label-party device. The method includes obtaining data to be processed, the data to be processed comprising multiple object identifiers and a feature value corresponding to each object identifier; binning the data to be processed based on the feature value corresponding to each object identifier to obtain a number of bins; determining multiple target identifier sets from each bin, and transmitting each target identifier set to a label-party device; receiving each piece of set label distribution information corresponding to each target identifier set from the label-party device, and determining bin label distribution information corresponding to each bin based on each piece of set label distribution information; and merging bins based on a binning policy and each piece of bin label distribution information to obtain a final binning result.

An embodiment of this application provides a non-transitory computer readable storage medium, the computer program product or the computer program including computer instructions, the computer instructions being stored in the computer-readable storage medium; and a processor of an electronic device reads the computer instructions from the computer-readable storage medium, and executes the computer instructions, to implement the method according to the embodiment of this application.

In embodiments consistent with the present disclosure, after data to be processed, including multiple object identifiers and a feature value corresponding to each object identifier, is obtained, initial binning is performed on the data to be processed based on the feature value corresponding to each object identifier to obtain a preset number of binning results. Then, multiple target identifier sets in each bin are sequentially transmitted to a label-party device, each piece of set label distribution information corresponding to each target identifier set transmitted by the label-party device is further received, and bin label distribution information corresponding to each bin is determined based on each piece of set label distribution information. A merging process is performed on each bin based on a preset binning policy and each piece of bin label distribution information to obtain a final binning result. In this process, a feature-party device transmits the target identifier sets formed by its own object identifiers to the label-party device, and the label-party device returns label distribution information corresponding to target label sets to the feature-party device rather than transmits encrypted label information to the feature-party device. Therefore, information leakage caused by decryption of the label information may be avoided, and the data security is further improved.

DESCRIPTION OF EMBODIMENTS

Figure 1:
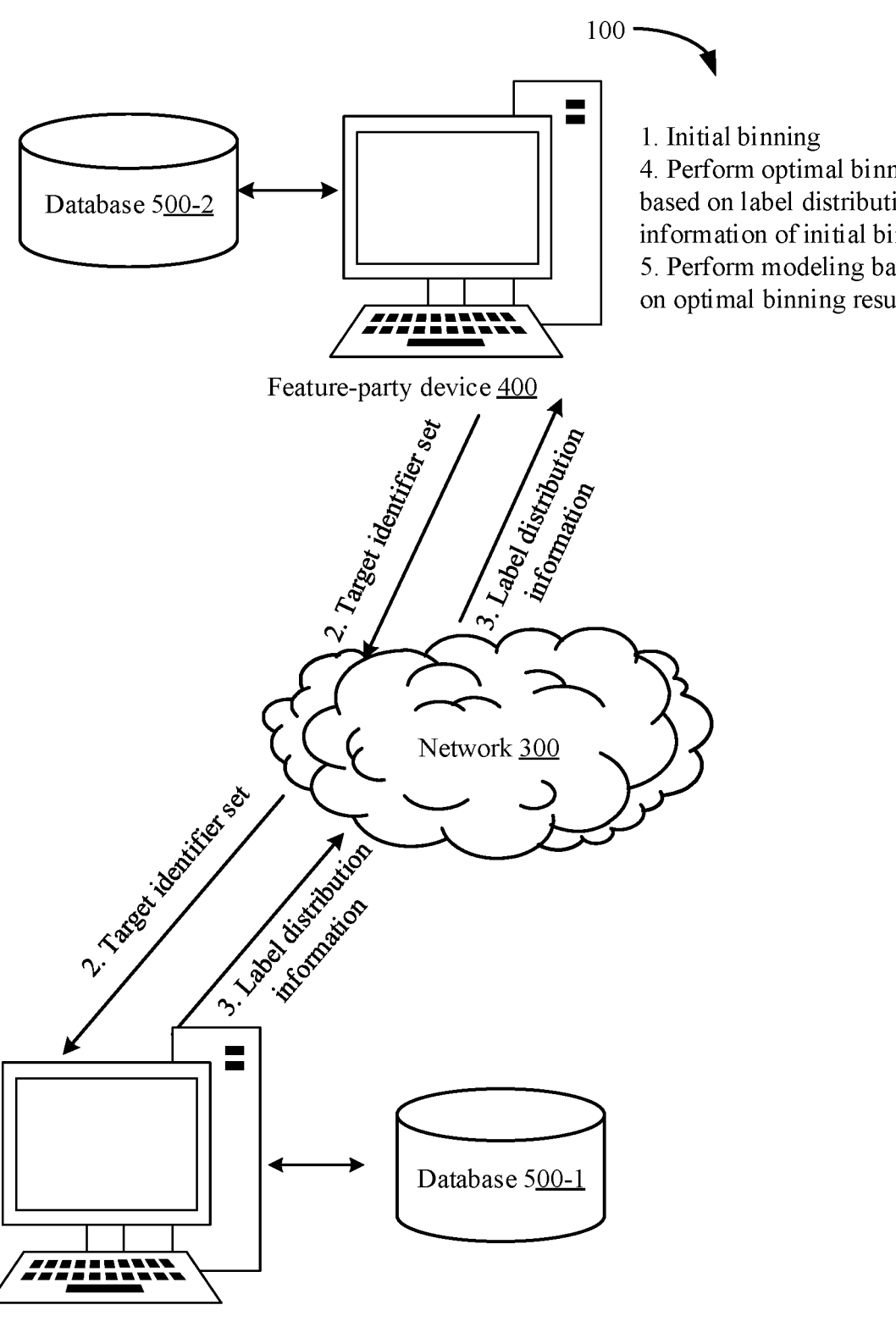
FIG. 1 is a schematic diagram of a network architecture of a data processing system 100 according to an embodiment of this application.

To make the objectives, technical solutions, and advantages of this application clearer, the following describes this application with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

It is to be noted that various data information is involved in the embodiments of this application, such as feature data and object identifiers. When the embodiments of this application are applied to actual products or technologies, a license or consent needs to be obtained, and the collection, use, and processing of relevant data comply with relevant laws and regulations and standards of relevant countries and regions.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are described, terms involved in the embodiments of this application are described. The terms provided in the embodiments of this application are applicable to the following explanations.

(1) Federated learning (FL): it is distributed artificial intelligence suitable for training a machine learning model that decentralizes a training process such that user privacy may be protected without transmitting data to a centralized server. The training process is decentralized to many devices to improve the efficiency.

(2) Longitudinal federated learning: it is a machine learning method of segmenting, when users of two datasets overlap more and user features overlap less, the datasets vertically (i.e., in a feature dimension) and extracting data corresponding to the same users on both sides but not exactly the same user features for training.

(3) Binning: a segment of continuous values are divided into a plurality of segments, and the values of each segment are regarded as a class. A process of converting continuous values into discrete values is commonly referred to as binning.

(4) Quantile binning: boundary values of bins are selected, so that the numbers of elements in various bins are approximately the same. For example, M is 50, and each bin contains approximately 2% of elements.

(5) Optimal binning (OB): a basic assumption of continuous feature discretization is that contributions of value ranges of different intervals to a result are different. Optimal binning is a binning method of determining the number of bins and boundaries of the bins to maximize the sum of contributions of each bin to the result.

(6) Host party: it is a data source without labels, which holds a feature dimension Xi. The host party corresponds to a feature-party device in the embodiments of this application.

(7) Guest party: it is a data source providing labels that indicate whether samples are positive or negative samples and are valued to 0 or 1. The guest party corresponds to a label-party device in the embodiments of this application.

(8) Information value (IV): in binary classification of machine learning, the IV is mainly used for encoding and predictive ability evaluation of input variables. The magnitude of an IV of a feature variable indicates a predictive ability of the variable.

In order to better understand a feature binning method provided in the embodiments of this application, a feature binning method in the related art and shortcomings thereof are first described.

In some embodiments of the feature binning method, label information of a guest party needs to be homomorphically encrypted and transmitted to a host party, and there is a risk that the label information is decrypted by the host party. In addition, the guest party needs to summarize label distribution information and calculate weights of evidence (WOE) and IVs, and there is a risk of credential stuffing.

Based on this, the embodiments of this application provide a feature binning method, apparatus, and device, a computer-readable storage medium, and a computer program product, which may solve the problems of label information leakage and credential stuffing. An exemplary application of the feature binning device provided in the embodiments of this application will be described below. The device provided in the embodiments of this application may be implemented as various types of user terminals, such as a notebook computer, a tablet computer, a desktop computer, a set-top box, and a mobile device (such as a mobile phone, a portable music player, a personal digital assistant, a dedicated messaging device, and a portable game device), or may be implemented as a server. An exemplary application of the device implemented as a feature-party device will be described below.

Referring to FIG. 1, FIG. 1 is a schematic diagram of a network architecture of a data processing system 100 according to an embodiment of this application. As shown in FIG. 1, the network architecture at least includes a label-party device 200 (corresponding to a guest party in other embodiments), a network 300, a feature-party device 400 (corresponding to a host party in other embodiments), a database 500-1 of the label-party device, and a database 500-2 of the feature-party device. In order to support an exemplary application, the label-party device 200 and the feature-party device 400 may be participants for training a machine learning model in vertical federated learning. The feature-party device 400 may be a client, such as a participant device of each bank or hospital that stores user feature data. The client may be a device with a model training function, such as a notebook computer, a tablet computer, a desktop computer, and a dedicated training device. Alternatively, the feature-party device 400 may be a server. The label-party device 200 may be a device in a government device. The label-party device 200 may be a client or a server. The label-party device 200 is connected with the feature-party device 400 through the network 300. The network 300 may be a wide area network, or a local area network, or a combination thereof, and implements data transmission by use of a wireless or wired link.

When the data to be processed (i.e., feature data) need to be binned and stored, the feature-party device 400 may first perform initial quantile binning based on feature values, and transmit multiple object identifiers in each initial binning result of quantile binning to the label-party device 200 as a target identifier set. The label-party device returns label distribution information corresponding to the target identifier set. After obtaining the label distribution information of all initial bins, the feature-party device 400 optimizes the multiple initial bins according to a preset binning policy to obtain a final binning result. In some embodiments, after obtaining the final binning result, the feature-party device performs feature screening to obtain target feature data for modeling and model training, and performs modeling and model training based on the target feature data. The data processing system may include one or more feature-party devices and one or more label-party devices.

Figure 2A:
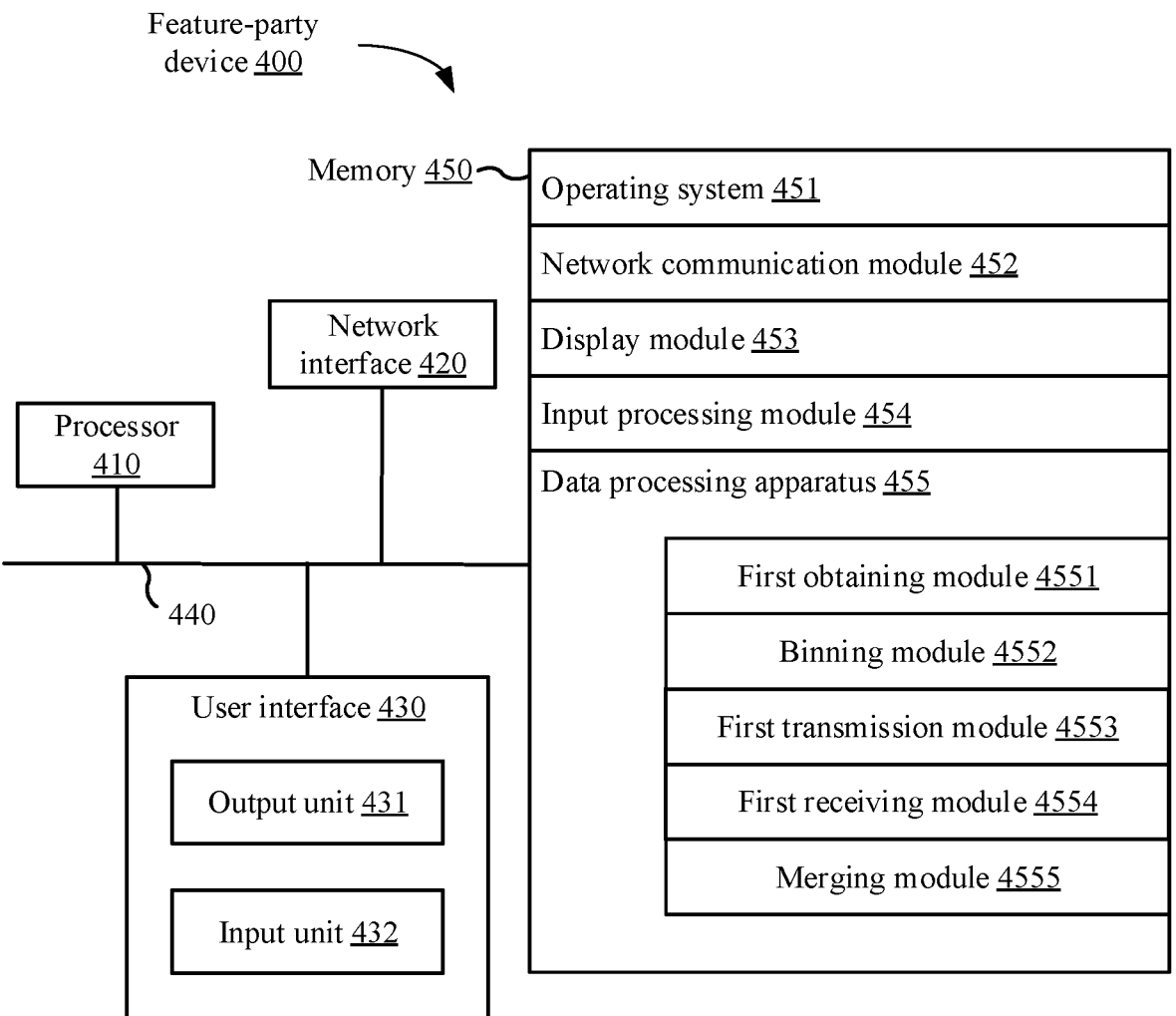
FIG. 2A is a structural diagram of a feature-party device 400 according to an embodiment of this application.

Referring to FIG. 2A, FIG. 2A is a schematic structural diagram of a feature-party device 400 according to an embodiment of this application. As shown in FIG. 2A, the feature-party device 400 includes: at least one processor 410, a memory 450, at least one network interface 420, and a user interface 430. All the components in the feature-party device 400 are coupled together by using the bus system 440. It may be understood that, the bus system 440 is configured to implement connection and communication between the components. In addition to a data bus, the bus system 440 further includes a power bus, a control bus, and a state signal bus. However, for clear description, various types of buses in FIG. 2A are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices away from the processor 410 in a physical position.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another computing device through one or more (wired or wireless) network interfaces 420. Exemplary network interfaces 420 include: Bluetooth, Wireless Fidelity (WiFi), Universal Serial Bus (USB), etc.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the apparatus provided in the embodiments of this application may be implemented by software. FIG. 2A shows a data processing apparatus 455 stored in the memory 450, which may be software in form of a program, a plug-in, etc., including the following software modules: a first obtaining module 4551, a binning module 4552, a first transmission module 4553, a first receiving module 4554, and a merging module 4555. These modules are logical, and thus may be combined or split arbitrarily according to functions to be realized. The following describes functions of the modules.

In order to better understand the method provided in the embodiments of this application, artificial intelligence, various branches of artificial intelligence, and fields of application of the method provided in the embodiments of this application are first described.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing technology, machine learning/deep learning, and the like. The solutions provided in the embodiments of this application mainly involve technologies such as ML of AI. The following is the description for the technologies.

Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, to keep improving its performance. The ML is the core of the AI, is a basic way to make the computer intelligent, and is applied to various fields of AI. ML and DL usually include technologies such as artificial neural network, belief network, reinforcement learning, transfer learning, and inductive learning.

In the embodiments of this application, the feature-party device and the label-party device may be node devices in a blockchain system, and correspondingly, the data to be processed and the label information corresponding to each object identifier may be obtained from nodes on a blockchain.

The data processing method based on the federated learning provided in the embodiments of this application is described with reference to an exemplary application and implementation of the terminal provided in this embodiment.

Figure 3:
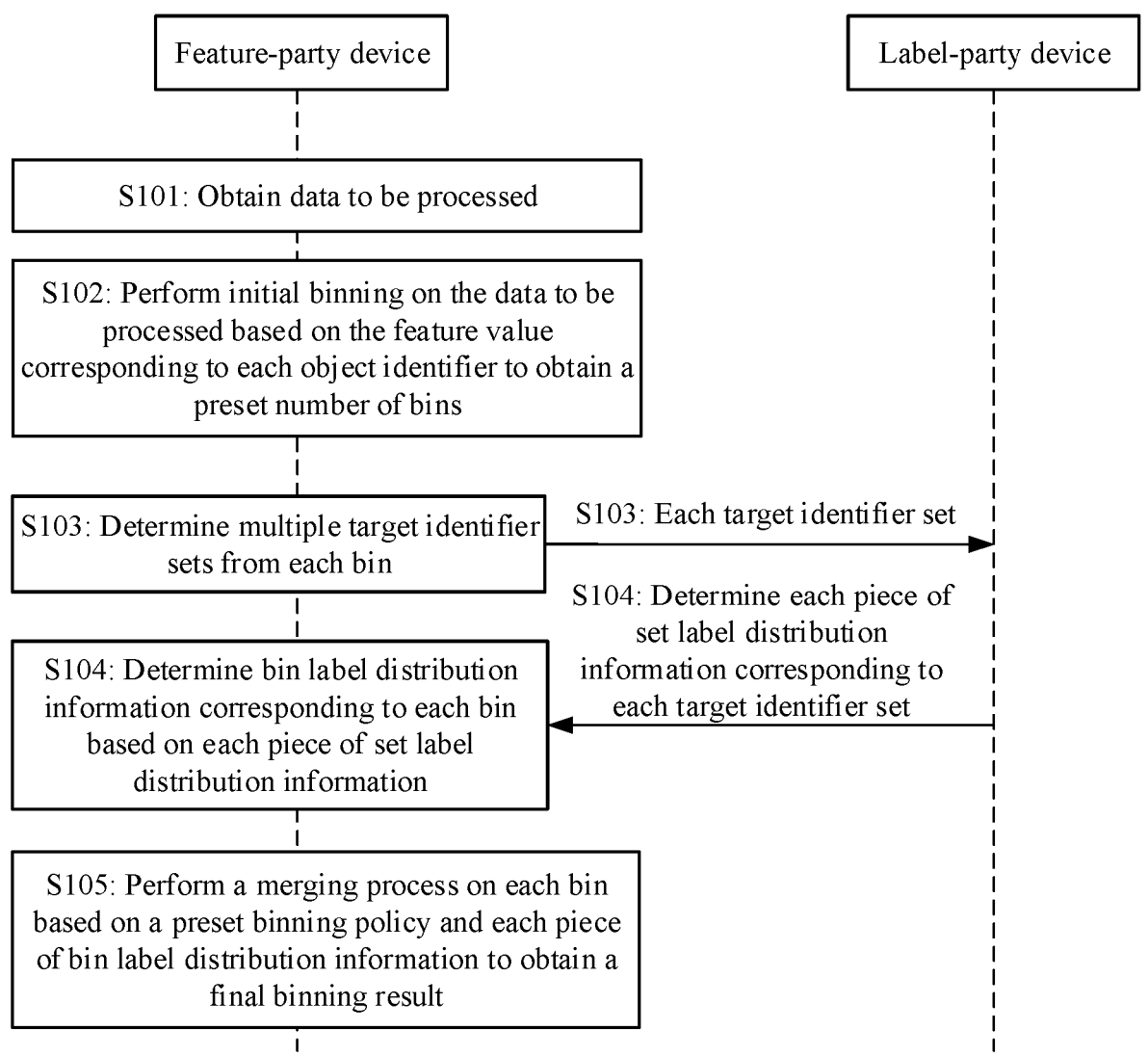
FIG. 3 is a schematic flowchart of a federated-learning-based data processing method according to an embodiment of this application.

Refer to FIG. 3, FIG. 3 is a flowchart of a federated-learning-based data processing method according to an embodiment of this application. The method is applied to a feature-party device, and is described with reference to steps shown in FIG. 3.

Step S101: Obtain data to be processed.

The data to be processed includes multiple object identifiers and a feature value corresponding to each object identifier. One object identifier and the feature value corresponding to the object identifier form a piece of feature data. The data to be processed includes multiple pieces of feature data.

In addition, an object identifier may correspond to one feature dimension (such as age) or multiple feature dimensions (such as age, gender, region, and monthly income), so an object identifier corresponds to one feature value or multiple feature values. In this embodiment, it is assumed that an object identifier corresponds to one feature dimension, and when an object identifier corresponds to multiple feature dimensions, a final binning result of the data to be processed in each feature dimension may be calculated by the method provided in this embodiment.

Step S102: Perform initial binning on the data to be processed based on the feature value corresponding to each object identifier to obtain a preset number of bins.

In step S102, initial binning may be performed on the data to be processed in an unsupervised binning method. For example, initial binning may be performed in a quantile binning method and an equal-frequency binning method and an equal-distance binning method to obtain a preset number of bins.

Taking the equal-distance binning method as an example, if the preset number, i.e., a preset bin number, is M, a bin interval is determined based on a maximum feature value and minimum feature value in the feature values corresponding to the various object identifiers as well as the preset number, and a range of each bin is determined based on the minimum feature value and the bin interval. Then, the bin where each piece of feature data is located is determined according to the range of each bin and the feature value corresponding to each object identifier.

Taking the quantile binning method as an example, the number of object identifiers in the data to be processed and the preset number are obtained first, and the number of object identifiers Q in each bin is determined according to the number of object identifiers and the preset number. Then, each piece of feature data in the data to be processed is sorted based on the feature values to obtain sorted feature data. Then, the Q pieces of feature data are sequentially loaded into the corresponding bins from front to back.

Step S103: Determine multiple target identifier sets from each bin, and sequentially transmit each target identifier set to a label-party device.

The target identifier set includes at least three object identifiers. In some embodiments, feature values corresponding to each object identifier in the multiple target identifier sets are generally the same. When three or more same feature values may not be obtained finally, feature values corresponding to each object identifier in the target identifier sets may be different, but each object identifier in the target identifier sets belongs to the same bin.

In step S103, the feature data in each bin may be sorted based on the feature values. For example, the feature data may be sorted in an order from small to large, and the feature data corresponding to the same feature value is arranged together. Then, one feature value is randomly extracted from the feature values in each bin. An object identifier set corresponding to the feature value is determined. R object identifiers are randomly extracted from the object identifier set corresponding to the feature value. The R object identifiers are determined as a target identifier set.

For example, the feature dimension is age, and a certain initial bin includes feature data corresponding to ages of 18 to 25. First, it is determined that feature values in this bin are {18, 19, 20, 21, 22, 23, 24, 25}, and one feature value is randomly extracted. For example, the feature value 20 is extracted, and then an object identifier set corresponding to the age of 20 is determined. If the object identifier set includes 100 object identifiers, 10 object identifiers are randomly extracted from the 100 object identifiers every time and determined as a target identifier set, and the target identifier set is transmitted to a label-party device to obtain corresponding label distribution information. After label distribution information corresponding to all target identifier sets extracted from the object identifier set corresponding to the feature value is obtained, one feature value is randomly extracted, and the foregoing process is repeated until all the feature values in the feature dimension are traversed.

In this embodiment, multiple target identifier set may be obtained from a single bin. Multiple target identifier sets in a single bin may be processed in sequence, while target identifier sets in different bins may be processed in parallel.

Step S104: Receive each piece of set label distribution information corresponding to each target identifier set transmitted by the label-party device, and determine bin label distribution information corresponding to each bin based on each piece of set label distribution information.

The set label distribution information is used for representing the numbers of positive samples and negative samples in the target identifier set. For example, the set label distribution information may be (4, 6), where 4 represents the number of positive samples, and 6 represents the number of negative samples. That is, a target identifier set including 10 object identifiers include four positive samples and six negative samples. However, the feature-party device does not know which ones of the 10 object identifiers are positive samples and which ones are negative samples. After receiving each piece of set label distribution information transmitted by the label-party device, the feature-party device first determines whether the set label distribution information is invalid information. If the set label distribution information is invalid information, the set label distribution information is ignored. If the set label distribution information is not invalid information, bin label distribution information corresponding to the bin is updated based on the set label distribution information.

In some embodiments, an initial value of the bin label distribution information is (0, 0), indicating that an initial value of the number of positive samples is 0 and an initial value of the number of negative samples is 0. When a first piece of set label distribution information is received, assumed to be (4, 6), the bin label distribution information is updated to (4, 6). When a second piece of set label distribution information is received, assumed to be (2, 8), the bin label distribution information is updated to (6, 14), and so on. After all set label distribution information of the bin is obtained, the bin label distribution information of the bin is obtained.

Step S105: Perform a merging process on each bin based on a preset binning policy and each piece of bin label distribution information to obtain a final binning result.

The binning policy may be an IV-based binning policy, or ChiMerge. In some embodiments of step S105, various adjacent binning results may be pre-merged, and label attribute information of merged bins are determined. Then, merging is performed when it is determined according to the label attribute information of the merged bins that a merging condition is satisfied. When a binning result may be merged with a previous adjacent binning result and a next adjacent binning result, IVs of the two merged bins may be compared to determine a target binning result. The operations are repeated for merging until a preset convergence condition is reached, to obtain a final binning result.

In the federated-learning-based data processing method provided in this embodiment, after data to be processed including multiple object identifiers and a feature value corresponding to each object identifier is obtained, initial binning is performed on the data to be processed based on the feature value corresponding to each object identifier to obtain a preset number of binning results. Then, multiple target identifier sets in each bin are sequentially transmitted to a label-party device, each piece of set label distribution information corresponding to each target identifier set transmitted by the label-party device is further received, and bin label distribution information corresponding to each bin is determined based on each piece of set label distribution information. A merging process is performed on each bin based on a preset binning policy and each piece of bin label distribution information to obtain a final binning result. In this data processing process, a feature-party device transmits the target identifier sets formed by its own object identifiers to the label-party device, and the label-party device returns label distribution information corresponding to target label sets to the feature-party device rather than transmits encrypted label information to the feature-party device. Therefore, information leakage caused by decryption of the label information may be avoided, and the data security is further improved.

In some embodiments, the "perform initial binning on the data to be processed based on the feature value corresponding to each object identifier to obtain a preset number of bins" in step S102 shown in FIG. 3 may be implemented by the following steps:

Step S1021: Determine a maximum feature value and a minimum feature value based on the feature values corresponding to the object identifiers.

In this embodiment, it is assumed that binning is performed based on a feature dimension of age, the maximum feature value is 85, and the minimum feature value is 10.

Step S1022: Determine (M−1) feature quantile values based on the maximum feature value, the minimum feature value, and a preset number M.

In some embodiments of step S1022, a feature interval value may be determined first based on the maximum feature value, the minimum feature value, and the preset number M: feature interval value=(maximum feature value−minimum feature value)/preset number. Then, (M−1) feature quantile values are determined based on the minimum feature value, an $i^{th}$ feature quantile value being minimum feature value+i*feature interval value. For example, if the preset number is 15, the (M−1) feature quantile values are 15, 20, 25, 30, 35, 40, 45, 50, 55, 60, 65, 70, 75, and 80 respectively.

Step S1023: Determine M feature intervals based on the minimum feature value, the maximum feature value, and the (M−1) feature quantile values.

The first feature interval is [minimum feature value, first feature quantile value), the second feature interval is [first feature quantile value, second feature quantile value), and so on, and an $M^{th}$ feature interval is [$(M−1)^{th}$ feature quantile value, maximum feature value].

Step S1024: Perform initial binning on the data to be processed based on each feature value in the data to be processed and the M feature intervals to obtain M bins.

An $i^{th}$ bin includes multiple pieces of feature data, and feature values corresponding to the multiple pieces of feature data are in an $i^{th}$ feature interval, i=1, 2, . . . , M.

An initial equal-distance binning process is completed by steps S1021 to S1024 to obtain a preset number of bins, each of which includes multiple pieces of feature data.

In some embodiments, the initial binning process may be performed in a quantile binning method to obtain multiple bins. In such case, data volumes of the bins are the same. For example, if 10 binning results are obtained, each binning result includes 10% of a data volume.

In some embodiments, after initial binning is performed on the data to be processed by steps S1021 to S1024, in order to improve the processing efficiency, data after initial binning may further be partitioned by the following steps.

Step S1025: Obtain a preset partition rule and a number of partitions N.

In this embodiment, the preset partition rule may be a hash partition rule, or other preset partition rules.

Step S1026: Determine a partition identifier of each piece of feature data in the $i^{th}$ bin based on each object identifier in the $i^{th}$ bin and the partition rule.

i=1, 2, . . . , M. In some embodiments, preset hash calculation may be performed on the object identifier to obtain a hash value, and then modN is performed on the hash value to obtain a result as the partition identifier. Therefore, the partition identifier is 0, 1, . . . , N−1.

Step S1027: Allocate each piece of feature data in the $i^{th}$ bin to an $i^{th}$ bin in the partition corresponding to the partition identifier of each piece of feature data.

Each partition includes M bins, and each piece of feature data in an $i^{th}$ bin is allocated to an ith bin of each partition. For example, a third bin includes 100 pieces of feature data, four partitions are preset, and the 1,000 pieces of feature data may be allocated to third bins in partition 0, partition 1, partition 2, and partition 3, to uniformly allocate data in the third binning results to each partition. Therefore, the running efficiency is improved.

In some embodiments, corresponding to the partitioning of the data to be processed by the feature-party device, the label-party device may partition label data of a label party by the following steps.

Step S201: The label-party device obtains a preset partition rule and a number of partitions N.

The partition rule and the number of partitions N used by the label-party device are the same as those used by the feature-party device.

Step S202: The label-party device determines a partition identifier of each piece of label data based on each object identifier and the partition rule.

The label data includes an object identifier and label information corresponding to the object identifier. The label information is used for representing whether the object identifier is a positive sample or a negative sample. The label information may be represented by 0 and 1. For example, 0 represents that the object identifier is a negative sample, and 1 represents that the object identifier is a positive sample. The positive sample may be correspondingly referred to as a good sample or normal sample, and the negative sample may also be referred to as a bad sample or a default sample.

In some embodiments of step S202, preset hash calculation may be performed on the object identifier to obtain a hash value, and then modN is performed on the hash value to obtain a result as the partition identifier.

In some embodiments, in addition to the label data, the label-party device may also store government data packets of identity feature, consumption ability, credit history, qualification honor, etc. The identity feature includes gender, age, identity card address, and school register as well as qualifications. The consumption ability includes: capture expends bases of the social insurance and the accumulation fund, etc. The credit history includes: the number of authorized applications, an authorization situation of credit service in the applications (APPs), the number of consecutive performance of the credit service, the number of dishonesty of the credit service, etc.

Step S203: The label-party device adds each piece of label data to the corresponding partition based on the partition identifier.

By steps S201 to S203, the label data may be partitioned in the same manner as the feature data based on the object identifier in the label-party device, so that it may be ensured that corresponding partitions of the feature-party device and the label-party device have the same id sets.

In some embodiments, the "determine multiple target identifier sets from each bin" in step S103 shown in FIG. 3 may be implemented by the following steps:

Step S1031: Determine a number of feature values S in an $i^{th}$ bin.

i=1, 2, . . . , M, M is the preset number, and S is a positive integer. In some embodiments of step S1031, each feature value in the $i^{th}$ bin is counted first to determine the number of feature values. The numbers of feature values corresponding to different bins may be the same or different.

Step S1032: Determine R unprocessed object identifiers corresponding to a $j^{th}$ feature value randomly.

R is a positive integer greater than 2, and j=1, 2, . . . , S. In some embodiments of step S1032, one feature value is determined randomly from S feature values every time. That is, a $j^{th}$ feature value is determined randomly at the $j^{th}$ time. Then, an object identifier set corresponding to the $j^{th}$ feature value is determined. R unprocessed object identifiers are determined randomly from the object identifier set corresponding to the $j^{th}$ feature value.

In this embodiment, each object identifier is initially regarded as an unprocessed object identifier.

Step S1033: Determine the R unprocessed object identifiers as a target identifier set.

The target identifier set includes R object identifiers. R is required to be greater than 2 because if R is equal to 2, the label information of each object identifier may be reversely deduced from the label distribution information returned by the label-party device, resulting in information leakage.

In this embodiment, the foregoing process is repeated for each piece of feature data in each bin, to determine the multiple target identifier sets in each bin.

Figure 4:
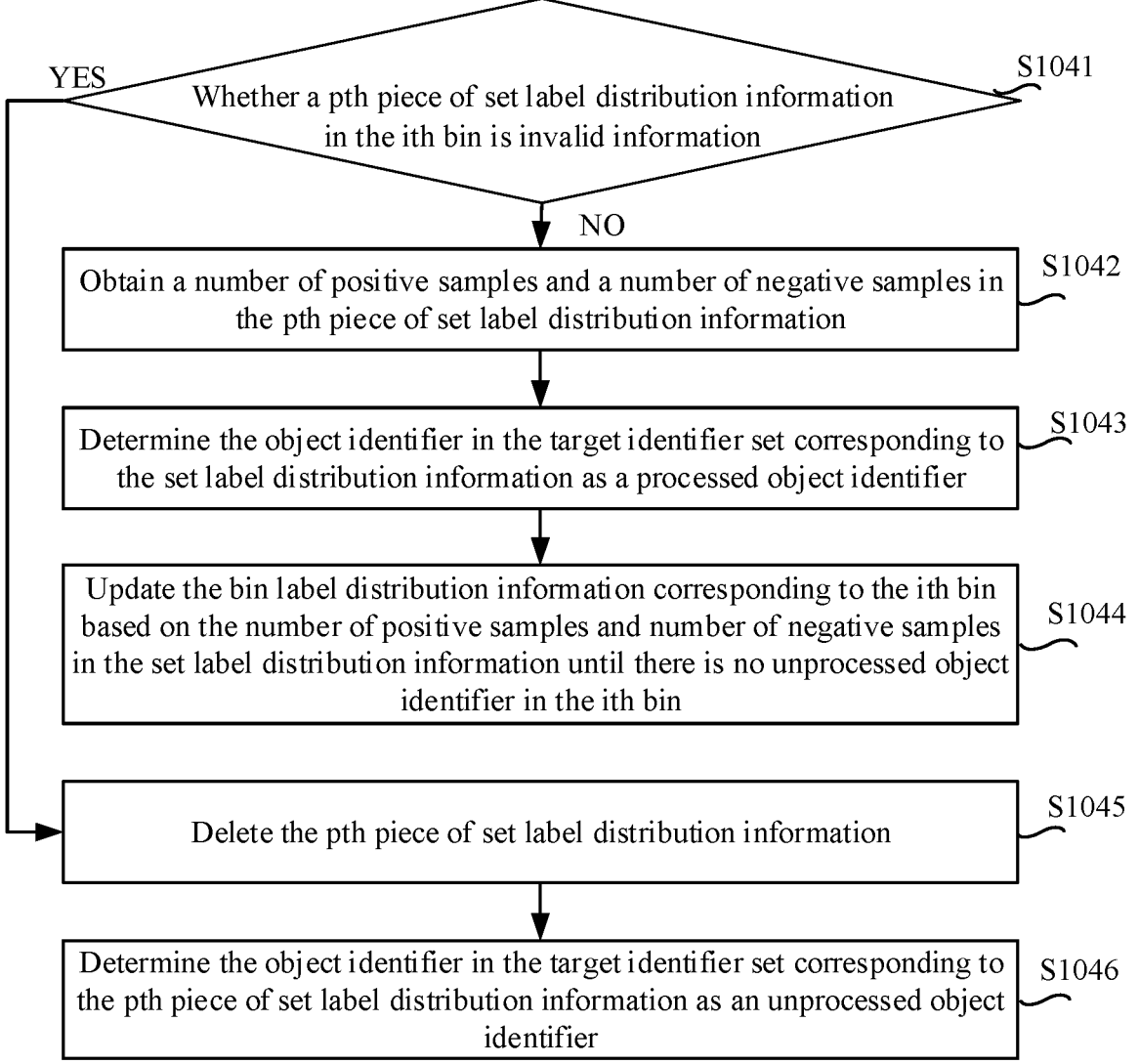
FIG. 4 is a schematic flowchart of determining bin label distribution information corresponding to each bin according to an embodiment of this application.

In some embodiments, the "determine bin label distribution information corresponding to each bin based on each piece of set label distribution information" in step S104 may be implemented by steps S1041 to S1046 shown in FIG. 4. Each step will now be described in combination with FIG. 4.

Step S1041: Determine whether a $p^{th}$ piece of set label distribution information in the $i^{th}$ bin is invalid information.

The invalid information may be preset, such as (0, 0). In some embodiments, the invalid information may be another preset value, such as a one-dimensional numerical value 0. When the $p^{th}$ piece of set label distribution information is invalid information, step S1045 is performed. When the $p^{th}$ piece of set label distribution information is not invalid information, it indicates that the set label distribution information is valid information, and step S1042 is performed. i=1, 2, . . . , M, M being the preset number. p=1, 2, . . . , W, W being the total number of target label sets in the $i^{th}$ bin.

Step S1042: Obtain, when the set label distribution information is not preset invalid information, a number of positive samples and number of negative samples in the $p^{th}$ piece of set label distribution information.

When the set label distribution information is not the preset invalid information, the set label distribution information is in form of (X, Y), where X is the number of positive samples, and Y is the number of negative samples. Therefore, values of X and Y may be obtained to obtain the number of positive samples and number of negative samples in the $p^{th}$ piece of set label distribution information.

Step S1043: Determine the object identifier in the target identifier set corresponding to the set label distribution information as a processed object identifier.

In some embodiments, a flag value may be set for each object identifier to represent whether the object identifier is processed or unprocessed. The flag value may be a binary value, where 0 represents that the object identifier is unprocessed, and 1 represents that the object identifier is processed. Each object identifier is initially regarded as being unprocessed by default.

Step S1044: Update the bin label distribution information corresponding to the $i^{th}$ bin based on the number of positive samples and number of negative samples in the set label distribution information until there is no unprocessed object identifier in the $i^{th}$ bin.

Step S1045: Delete the $p^{th}$ piece of set label distribution information when the $p^{th}$ piece of set label distribution information is the preset invalid information.

When the $p^{th}$ piece of set label distribution information is invalid information, the set label distribution information is ignored and deleted.

Step S1046: Determine the object identifier in the target identifier set corresponding to the $p^{th}$ piece of set label distribution information as an unprocessed object identifier.

Since the set label distribution information is invalid information, it is considered that a label distribution of the corresponding target identifier set has yet not been obtained. Therefore, each object identifier in the target identifier set is kept as an unprocessed object identifier.

In some embodiments, the "perform a merging process on each bin based on a preset binning policy and each piece of bin label distribution information to obtain a final binning result" in step S105 shown in FIG. 3 may be implemented by the following steps:

Step S1051: Pre-merge each bin with an adjacent bin of the bin to obtain multiple candidate bins.

Assuming that there are M bins, an $i^{th}$ bin is pre-merged with an $(i+1)^{th}$ binning result to obtain (M−1) candidate bins, i=1, 2, . . . , M. In this embodiment, merging two adjacent bins refers to merging feature intervals and label distributions corresponding to the two bins respectively. For example, a first bin corresponds to a feature interval of [10, 15) and label distribution information of (10, 100), and a second bin corresponds to a feature interval of [15, 20) and label distribution information of (20, 100). The first bin is merged with the second bin to obtain a first candidate bin that corresponds to a feature interval of [10, 20) and label distribution information of (30, 200).

Step S1052: Determine candidate label attribute information of each candidate bin.

The label attribute information includes a number of positive samples, a number of negative samples, and a percentage of positive samples. Following the foregoing example, for the first candidate bin, a number of positive samples is 30, a number of negative samples is 200, and a percentage of positive samples is 13%.

Step S1053: Determine, based on the candidate label attribute information, whether the candidate bin satisfies a merging condition.

The merging condition may include whether the number of positive samples is greater than a minimum number of positive samples, whether the number of negative samples is greater than a minimum number of negative samples, and whether the percentage of positive samples is greater than a maximum percentage and less than a maximum percentage.

When it is determined based on the candidate label attribute information that the candidate bin satisfies the merging condition, step S1054 is performed. When it is determined based on the candidate label attribute information that the candidate bin does not satisfy the merging condition, step S1056 is performed.

Step S1054: Determine an information value of each candidate bin in response to determining based on the candidate label attribute information that the candidate bin satisfies the merging condition.

In some embodiments of determining the IV of each candidate bin, a weight of evidence (WoE) of a $q^{th}$ candidate bin is calculated first, where WoE_q=ln(percentage of negative samples/percentage of positive samples). Then, an IV of the $q^{th}$ candidate bin is calculated according to IV_q= (percentage of negative samples-percentage of positive samples)*WoE_q.

Step S1055: Determine a target bin based on the information value of each candidate bin.

In some embodiments of step S1055, whether the various candidate bins include any candidate bin pair may be determined first, the candidate bin pair being formed by two candidate bins including the same bin. For example, a first candidate bin is obtained by merging a first bin with a second bin, and a second candidate bin is obtained by merging the second bin and a third bin. In such case, the first candidate bin and the second candidate bin form a candidate bin pair. When the various candidate bins include a candidate bin pair, the candidate bin with a larger information value in the candidate bin pair is determined as a target bin. Multiple candidate bin pairs are sequentially compared to determine multiple corresponding candidate bins. When the various candidate bins do not include any candidate bin pair, each candidate bin satisfying the merging condition is a target bin.

Step S1056: Cancel pre-merging corresponding to the candidate bin.

When the candidate bin does not satisfy the merging condition, pre-merging corresponding to the candidate bin is canceled.

Step S1057: Merge each target bin with an adjacent bin of the target bin again until an optimization objective is achieved, to obtain each final binning result.

After a first round of merging, each target bin includes one or two initial bins, and an IV of each target bin is obtained. Then, a second round of merging is performed. After the second round of merging, each target bin includes, one, two, three, or four initial bins, and an IV of each target bin is obtained again. Whether an optimization objective is achieved is determined based on the IV of each target bin. When it is determined that the optimization objective is achieved, it is determined that a final binning result is obtained.

Figure 5:
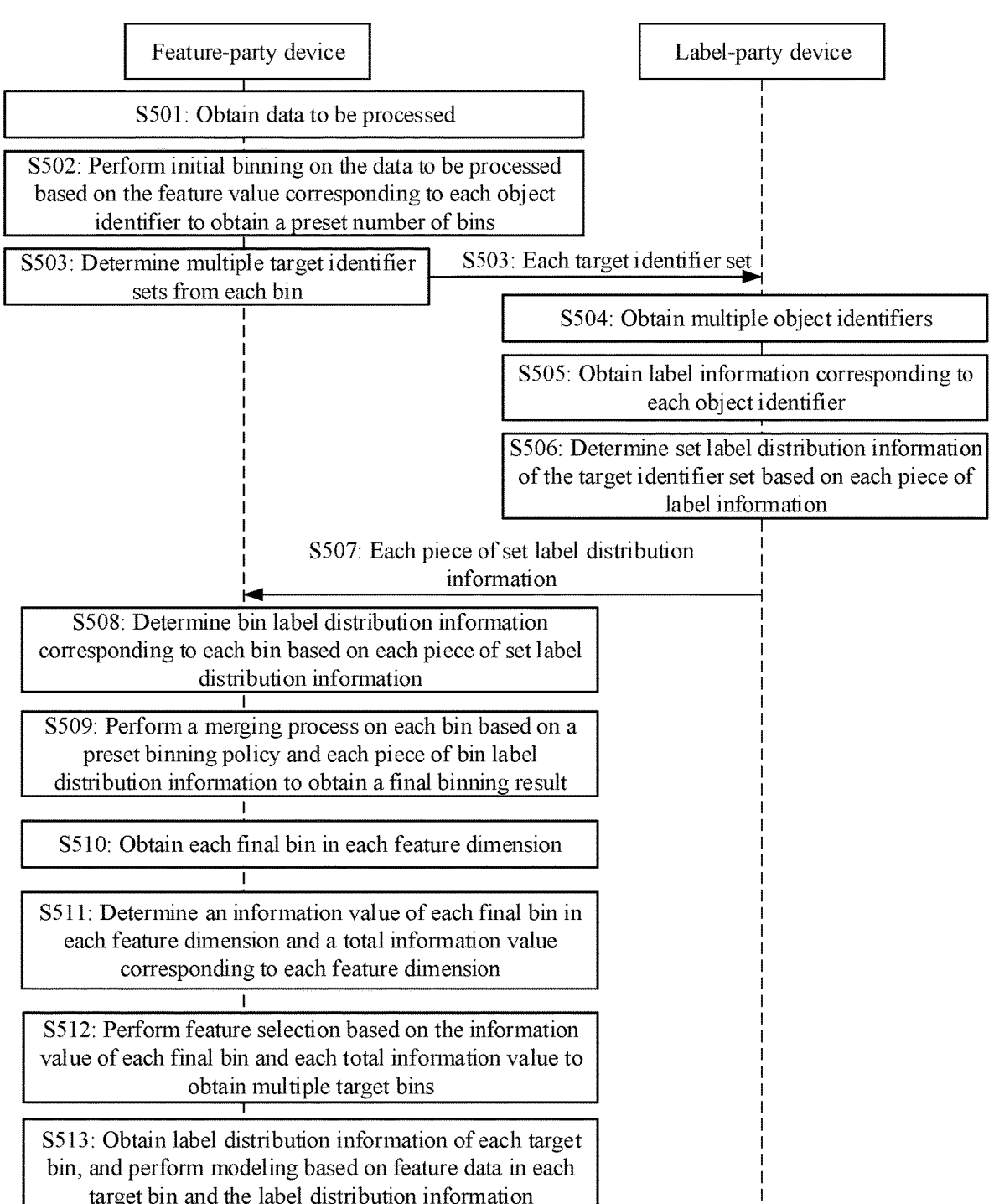
FIG. 5 is another schematic flowchart of a federated-learning-based data processing method according to an embodiment of this application.

Based on the above-mentioned embodiments, an embodiment of this application also provides a federated-learning-based data processing method, applied to the network architecture shown in FIG. 1. FIG. 5 is another schematic flowchart of a federated-learning-based data processing method according to an embodiment of this application. As shown in FIG. 5, the process includes the following steps:

Step S501: A feature-party device obtains data to be processed.

The data to be processed includes multiple object identifiers and a feature value corresponding to each object identifier.

Step S502: The feature-party device performs initial binning on the data to be processed based on the feature value corresponding to each object identifier to obtain a preset number of bins.

Step S503: The feature-party device determines multiple target identifier sets from each bin, and sequentially transmits each target identifier set to a label-party device.

The target identifier set includes at least three object identifiers. In some embodiments, the feature-party device transmits the target identifier sets to the label-party device through a message queue Pulsar.

Step S504: The label-party device receives the target identifier set transmitted by the feature-party device, and obtains the multiple object identifiers in the target identifier set.

Step S505: The label-party device obtains label information corresponding to each object identifier.

The label-party device stores mappings between object identifiers and label information. Therefore, it is ensured that time complexity of obtaining label information corresponding to any object identifier is O(1).

Step S506: The label-party device determines set label distribution information of the target identifier set based on each piece of label information.

In some embodiments, the label-party device statistically obtains a number of positive samples and number of negative samples corresponding to the target identifier set, and determines set label distribution information of the target identifier set according to the number of positive samples and the number of negative samples. In some embodiments, the number of positive samples and the number of negative samples are checked. When the number of positive samples and the number of negative samples succeed in check, the number of positive samples and the number of negative samples are determined as the set label distribution information. When the number of positive samples and the number of negative samples fail in check, preset invalid information is determined as the set label distribution information.

Step S507: The label-party device transmits the set label distribution information to the feature-party device.

Step S508: The feature-party device receives each piece of set label distribution information corresponding to each target identifier set transmitted by the label-party device, and determines bin label distribution information corresponding to each bin based on each piece of set label distribution information.

Step S509: The feature-party device performs a merging process on each bin based on a preset binning policy and each piece of bin label distribution information to obtain a final binning result.

It is to be noted that concepts and steps in this embodiment that are the same as those in the other embodiments refer to the descriptions in the other embodiments.

Step S510: The feature-party device obtains each final bin in each feature dimension.

When feature data in the feature-party device includes multiple feature dimensions, optimal binning may be performed by the foregoing steps based on each feature dimension to obtain each final bin in each feature dimension.

Step S511: The feature-party device determines an information value of each final bin in each feature dimension and a total information value corresponding to each feature dimension.

The IV of each final bin in each feature dimension has been determined in the process of determining the final binning result. The total information value corresponding to each feature dimension is the sum of the IVs of the various final bins in this feature dimension.

Step S512: The feature-party device performs feature selection based on the information value of each final bin and each total information value to obtain multiple target final bins.

In some embodiments of step S512, whether the total information value corresponding to each feature dimension is greater than a feature information threshold may be determined first. The feature dimension greater than the feature information threshold is determined as a target feature dimension. Then, whether the information value of each final bin in the target feature dimension is greater than a bin information threshold is determined. The final bin greater than the bin information threshold in the target feature dimension is determined as a target final bin.

Step S513: The feature-party device obtains label distribution information of each target final bin, and performs modeling based on feature data in each target final bin and the label distribution information.

In some embodiments of step S513, a vertical logistic regression federated learning method may be used for modeling. In some embodiments, after modeling is completed, it is also necessary to perform model training using the feature data in the target final bin and the label distribution information to finally obtain a trained neural network model.

In the federated-learning-based data processing method provided in this embodiment, after obtaining data to be processed including multiple object identifiers and a feature value corresponding to each object identifier, the feature-party device performs initial binning on the data to be processed based on the feature value corresponding to each object identifier to obtain a preset number of bins. Then, multiple target identifier sets in each bin are sequentially transmitted to a label-party device, and each piece of set label distribution information corresponding to each target identifier set transmitted by the label-party device is further received. The feature-party device determines bin label distribution information corresponding to each bin based on each piece of set label distribution information, and further performs a merging process on each bin based on a preset binning policy and each piece of bin label distribution information to obtain a final binning result. In this data processing process, the feature-party device transmits the target identifier sets formed by its own object identifiers to the label-party device, and the label-party device returns label distribution information corresponding to target label sets to the feature-party device rather than transmits encrypted label information to the feature-party device. Therefore, information leakage caused by decryption of the label information may be avoided, and the data security is further improved. After final bins in each feature dimension are obtained, feature screening is performed, and logistic regression modeling for vertical federated learning is performed using target final bins obtained by screening.

In some embodiments, the operation in step S506 shown in FIG. 5 that "the label-party device determines set label distribution information of the target identifier set based on each piece of label information" includes the following steps:

Step S5061: Determine a number of positive samples and a number of negative samples based on each piece of label information.

Step S5062: Determine whether the number of positive samples is less than a total number of object identifiers in the target identifier set and whether the number of negative samples is less than the total number of object identifiers.

When the number of positive samples is less than the total number of object identifiers, and the number of negative samples is less than the total number of object identifiers, it indicates that the corresponding label information of the target identifier set indicates positive samples and negative samples. In such case, the number of positive samples and the number of negative samples are determined as the label distribution information, and the feature-party device may not determine the label information corresponding to each object identifier according to the label distribution information. Therefore, step S5063 is performed. When the number of positive samples is equal to the total number of object identifiers, it indicates that the label information corresponding to all object identifiers in the target identifier set indicates positive samples. Alternatively, when the number of negative samples is equal to the total number of object identifiers, it indicates that the label information corresponding to all object identifiers in the target identifier set indicates negative samples. In such case, if the number of positive samples and the number of negative samples are determined as the label distribution information, the feature-party device may reversely deduce the label information corresponding to each object identifier when receiving the label distribution information. This is not allowed in federated learning. Therefore, step S5064 is performed.

Step S5063: Determine the number of positive samples and the number of negative samples as the set label distribution information when the number of positive samples is less than the total number of object identifiers in the target identifier set and the number of negative samples is less than the total number of object identifiers.

Step S5064: Determine preset invalid information as the set label distribution information of the target identifier set when the number of positive samples is equal to the total number of object identifiers in the target identifier set or the number of negative samples is equal to the total number of object identifiers.

The following describes an exemplary application of this embodiment.

In general, in vertical federal learning, the party holding labels is a guest (i.e., the label-party device in the other embodiments), and the other participant without labels is a host (i.e., the feature-party device in the other embodiments). It is a natural advantage for the guest party to perform optimal binning on its own data because the guest party holds the labels. However, the host party needs to use the labels of the guest party for optimal binning because it does not have labels.

For example, it is assumed that X1 of the host party represents age, and different age groups have different traits. Age may be divided into three age groups of 0-30, 31-50, and >50, or may be divided into five age groups of 0-20, 21-30, 31-45, 46-60, and >=61 shown in Table 1. For banks, different age groups have different credit scores and different abilities to follow treaties. It is very important for banks to segment age to reflect the group traits most accurately.

TABLE 1

Statistical Table of Binning Results and Label Distribution for Age

| AGE | Bad (Y = 1) | Good (Y = 0) | Bad % | Good % | WOE |
|---|---|---|---|---|---|
| 0-20 | 30 | 100 | 0.3 | 0.1 | 1.098612289 |
| 21-30 | 25 | 250 | 0.25 | 0.25 | 0 |
| 31-45 | 15 | 200 | 0.2 | 0.2 | −0.287682072 |
| 46-60 | 15 | 200 | 0.2 | 0.2 | −0.287682072 |
| >61 | 15 | 250 | 0.25 | 0.25 | −0.510825624 |
| total | 100 | 1000 | 1 | 1 | 0 |

It is assumed that the host party has features of totally four dimensions: X={X1, X2, X3, X4}, and the guest party only has Label={Y} information, where Y is a binary. The host party needs to perform optimal binning on X1, X2, X3, and X4 respectively by use of Y of the guest party. In optimal binning, initial binning is performed on the features first. Then, a label distribution histogram of each initial bin (usually obtained by quantile binning) is statistically obtained. Finally, some adjacent bins are merged until an optimal binning model converges, to obtain optimal bins.

Figure 6:
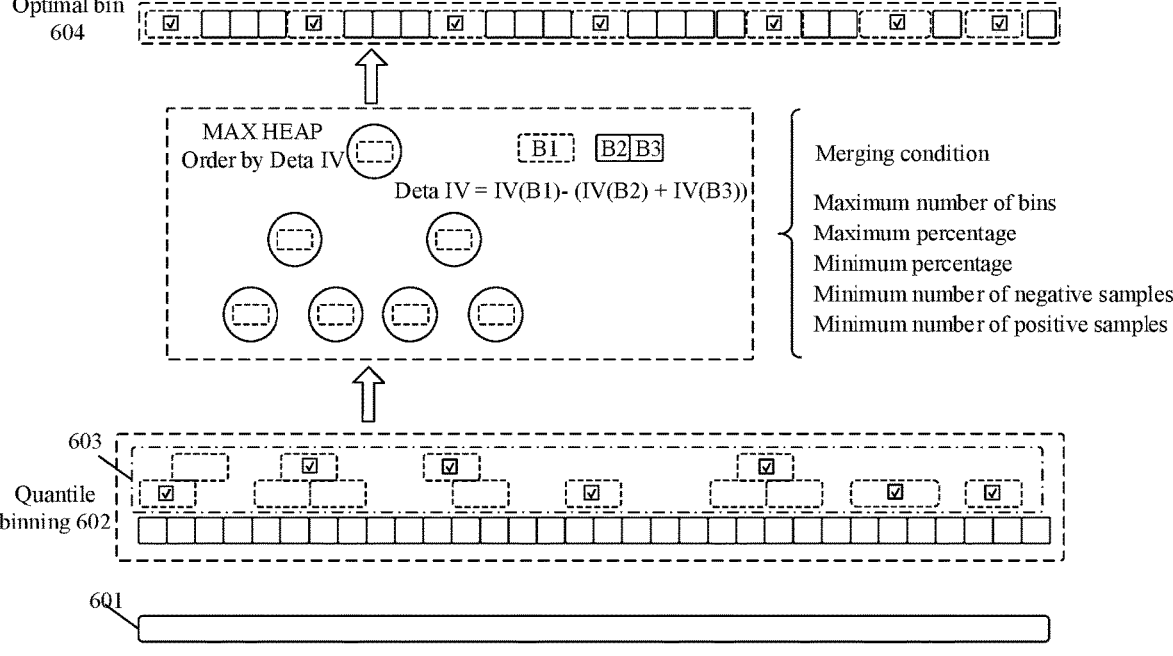
FIG. 6 is a schematic diagram of performing optimal binning on a certain feature according to an embodiment of this application.

FIG. 6 is a schematic diagram of a process of performing optimal binning on a certain feature according to an embodiment of this application. As shown in FIG. 6, the host party performs initial binning on original feature data 601 to obtain 32 initial bins 602. Then, label distribution data (i.e., the set label distribution information in the other embodiments) in the 32 initial bins is obtained. Adjacent bins that satisfy a merging condition are merged. 603 in FIG. 6 represents each possible merged bin. An optimal merging solution is determined based on an IV of each merged bin, to obtain an optimal binning result 604.

The feature binning method provided in this embodiment will now be described in combination with each step. The feature binning method provided in this embodiment may be implemented by the following steps:

Step S701: The host party performs quantile binning on Xi according to a hyper-parameter M (number of initial bins).

Step S701 corresponds to step S102 in the other embodiments. Here, quantile binning may ensure allocation of approximately the same elements to each bin. If M is 20, each bin contains approximately 5% of elements. Continuous features after binning are converted into discrete features, with values ranging from 0 to M−1.

Step S702: The guest party and the host party perform hash partition on an id column respectively.

Step S702 corresponds to steps S1025 and S201 in the other embodiments. In order to ensure the running efficiency, the guest party and the host party need to perform hash partition on the id column respectively, to ensure that data is uniformly distributed in different partitions and that corresponding partitions of the guest party and the host party have the same identifier set.

In some embodiments, hash partition may be performed on ids in each bin to ensure that each hash partition include all bins.

Step S703: The host party performs sorting in each partition according to values of features Xi, and the guest party caches mappings between identifiers and labels.

Figure 7:
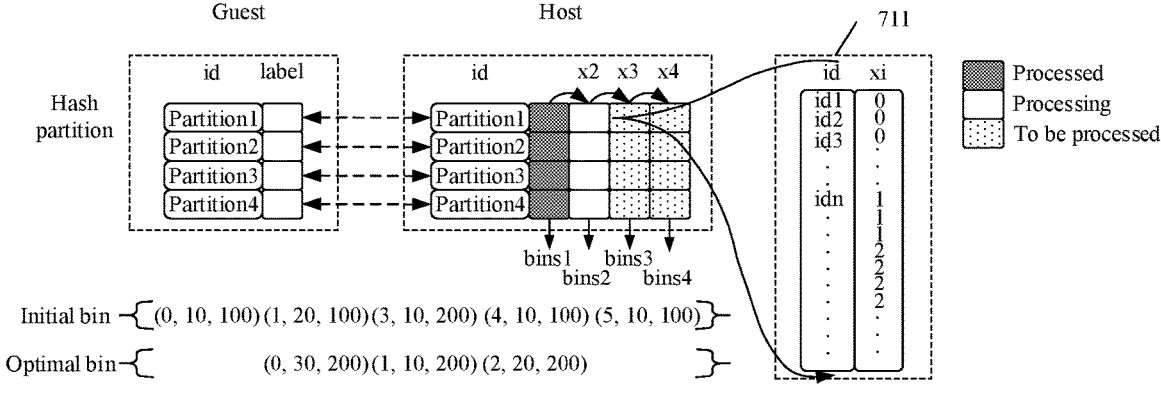
FIG. 7 is a schematic diagram of a process of optimal binning according to an embodiment of this application.

Here, sorting may be performed in each hash partition of the host party in an order from small to large according to values of Xi, and elements with the same value are arranged together, as shown by 711 in FIG. 7. Mappings between identifiers and labels are cached in each partition of the guest party. Therefore, it may be ensured that time complexity of obtaining label-id corresponding to any id is O(1).

Step S704: The host party statistically obtains a label distribution of each initial bin.

In some embodiments, the host party generates a random number r within a certain range (which may be 3 to 8, for example), sequentially extracts r ids from the same bin of each hash partition to obtain idSet(r), and transmits idSet(r) to the guest party through a message queue. After receiving idSet(r), the guest party statistically obtains a label distribution histogram, and checks validity of the label distribution histogram, namely checking whether label information corresponding to each id may be reversely deduced from a result. If being valid, the label distribution histogram is transmitted to the host party. Otherwise, (0, 0) is transmitted to the host party. After receiving the label distribution histogram, the host party saves the data. This step is repeated until preliminary label statistics for all bins of the host party is completed.

Step S705: The host party statistically summarizes all the label distribution histograms to obtain label distribution histogram information (corresponding to the bin label distribution information in the other embodiments) of all the bins.

Steps S704 and S705 correspond to step S104 in the other embodiments. For example, there are five initial bins for bins1, and a label distribution of each bin may be obtained by the foregoing five steps. Assuming that a label distribution of each final bin is as shown in FIG. 7: bin 0 includes 10 positive samples and 100 negative samples, bin 1 includes 20 positive samples and 100 negative samples, bin 2 includes 10 positive samples and 200 negative samples, bin 3 includes 10 positive samples and 100 negative samples, and bin 4 includes 10 positive samples and 100 negative samples.

Step S706: The host party performs optimal binning on an initial bin of binsi according to an optimal binning policy.

Step S706 corresponds to step S105 in the other embodiments. Essentially, two adjacent bins are selected every time and merged into a newest bin, and when a constraint is satisfied, this process is repeated until a final profit is maximum. Common optimal binning policies include IV-based optimal binning and chi-square-based optimal binning. Following the foregoing example, three bins are finally obtained by merging bin 0 with bin 1 and merging bin 3 with bin 4, where bin 0 includes 30 positive samples and 200 negative samples, bin 1 includes 10 positive samples and 200 negative samples, and bin 2 includes 20 positive samples and 200 negative samples.

In an embodiment of this application, the foregoing step S704 may be performed through the following steps.

Step S7041: Select one-dimensional data $X_i$ of the host party randomly.

Figure 8:
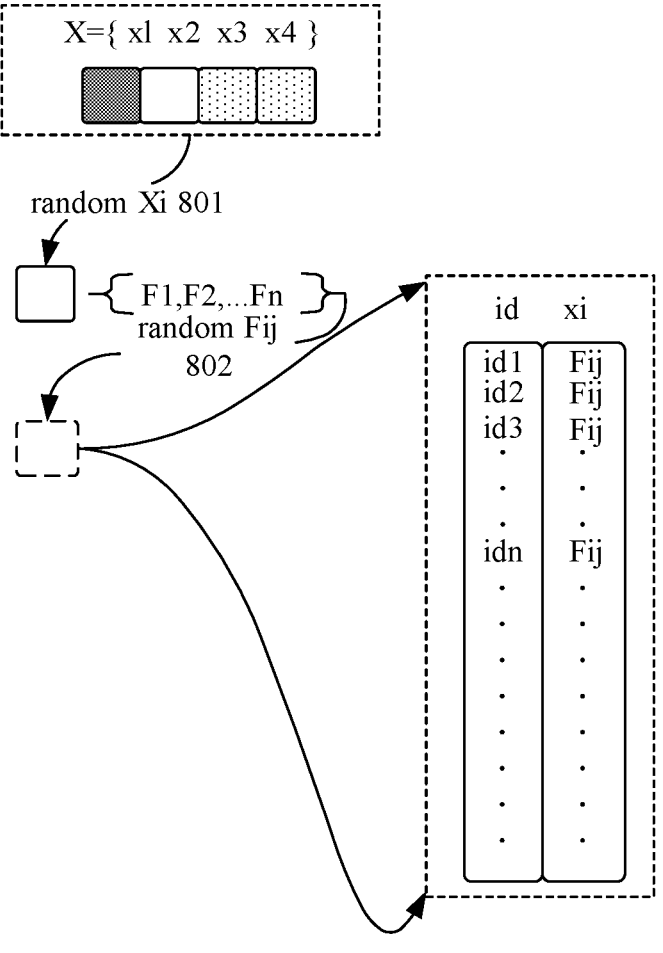
FIG. 8 is a schematic diagram of a process of randomly selecting a feature and a feature value corresponding to the feature according to an embodiment of this application.

It is assumed here that the host party has the feature of $X=\{X1, X2, X3, X4\}$, as shown in FIG. 8, and $X_i$ is any dimension of X1, X2, X3, and X4. The host party needs to ensure that the guest party does not known information $X_i$ 801 and may not deduce $X_i$ in other manners.

Step S7042: Select a feature randomly from $X_i$.

Assuming that $X_i$ includes n discrete features $\{F_1, F_2, \ldots, F_{n-1}\}$, etc., as shown in FIG. 8, a feature $F_{(i)(j)}$ 802 is randomly selected, and an $id_{(i)(j)}$ set of the feature $F_{(i)(j)}$ is obtained. Similarly, the host party needs to ensure that the guest party does not know the information $F_{(i)(j)}$ and may not deduce $F_{(i)(j)}$ in other manners.

Step S7043: The host party generates a random number r every time.

Here, the random number r is required to be greater than 2, to ensure that the host party may not determine sample labels according to label distributions returned by the guest host and deduce the random number r.

Step S7044: The host party randomly selects, from the $id_{(i)(j)}$ set of the feature $F_{(i)(j)}$, and transmits, to the guest party, r unlabeled $id_{(i)(j)}^{(r)}$.

Figure 9:
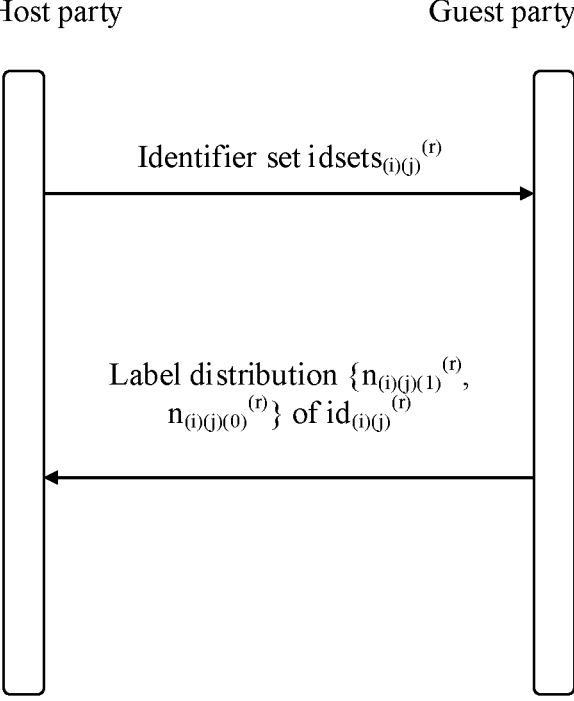
FIG. 9 is a schematic diagram of information interaction between a host party and a guest party according to an embodiment of this application.

Here, as shown in FIG. 9, the host party transmits $id_{(i)(j)}^{(r)}$ to the guest party, and needs to ensure that the guest party may not deduce $X_i$ and $F_{(i)(j)}$ from $id_{(i)(j)}^{(r)}$ after receiving $id_{(i)(j)}^{(r)}$.

Step S7045: The guest party statistically obtains, after receiving $id_{(i)(j)}^{(r)}$, a label distribution $\{n_{(i)(j)(1)}^{(r)}, n_{(i)(j)(0)}^{(r)}\}$ of $id_{(i)(j)}^{(r)}$ according to a label Y the guest party holds.

1 and 0 represent two values of the binary label Y respectively. The guest party checks the label distribution to ensure that label information of a single sample may not be leaked and that the host party may not deduce a label of the single sample in other manners.

When the label distribution is checked, whether at least one of $n_{(i)(j)(1)}^{(r)}$ and $n_{(i)(j)(0)}^{(r)}$ in the label distribution $\{n_{(i)(j)(1)}^{(r)}, n_{(i)(j)(0)}^{(r)}\}$ is 0 is determined. If any one of $n_{(i)(j)(1)}^{(r)}$ and $n_{(i)(j)(0)}^{(r)}$ is 0, it is determined that check fails, and (0, 0) is returned to the host party to notify the host party that check fails. Otherwise, it is determined that check succeeds, step S7046 is performed to transmit $\{n_{(i)(j)(1)}^{(r)}, n_{(i)(j)(0)}^{(r)}\}$ to the host party.

Step S7046: The guest party returns the label distribution $\{n_{(i)(j)(1)}^{(r)}, n_{(i)(j)(0)}^{(r)}\}$ to the host party, as shown in FIG. 9.

Step S7047: The host party saves $\{n_{(i)(j)(1)}^{(r)}, n_{(i)(j)(0)}^{(r)}\}$ and labels $id_{(i)(j)}^{(r)}$ as processed when check succeeds.

After step S7047, step S7043 is performed until statistics of all $id_{(i)(j)}$ of $F_{(i)(j)}$ is completed. Then, step S7042 is performed until all features of $X_i$ are processed. Then, step S7041 is performed until all the features of X of the host party are processed.

In a certain payment scenario, after sample alignment, each of the host party and the guest party has a sample size of 17w, where the host party has features of 25 dimensions, and the guest party has features of 29 dimensions. As shown in Table 2, the KS value of baseline LR is 37.98%, and the KS effect of LR after optimal binning is 38.19%, with a relative improvement of 0.5%. In a large-scale financial scenario, this effect may bring tens of millions of revenue.

TABLE 2

| Comparison of Model KS Value of Baseline LR and Model KS of Bin-Based LR | | | | |
| --- | --- | --- | --- | --- |
| | Host party | Guest party | Baseline LR | Bin-based LR |
| Data volume | 176,892 | 176,892 | — | — |
| Feature dimension | 25 | 29 | — | — |
| Model KS value | — | — | 37.98% | 38.19% |

In the feature binning method provided in this embodiment, the guest party does not transmit label information to the host party, and instead, the host party transmits IDSet to the guest party. In this method, the risk of leakage of the label information of the guest party may be avoided, and the information security may be improved. In addition, an IDSet positive and negative sample distribution detection mechanism is used, so that the risk of credential stuffing is avoided.

An exemplary structure of a data processing apparatus 455 implemented as software modules in the embodiments of this application will then be described. In some embodiments, as shown in FIG. 2A, the data processing apparatus 455 stored in a memory 440 may include the following software modules:

a first obtaining module 4551, configured to obtain data to be processed, the data to be processed including multiple object identifiers and a feature value corresponding to each object identifier; a binning module 4552, configured to perform initial binning on the data to be processed based on the feature value corresponding to each object identifier to obtain a preset number of bins; a first transmission module 4553, configured to determine multiple target identifier sets from each bin, and sequentially transmit each target identifier set to a label-party device, the target identifier set including at least three object identifiers; a first receiving module 4554, configured to receive each piece of set label distribution information corresponding to each target identifier set transmitted by the label-party device, and determine bin label distribution information corresponding to each bin based on each piece of set label distribution information; and a merging module 4555, configured to perform a merging process on each bin based on a preset binning policy and each piece of bin label distribution information to obtain a final binning result.

In some embodiments, the binning module is further configured to: determine a maximum feature value and a minimum feature value based on the feature values corresponding to the object identifiers; determine (M−1) feature quantile values based on the maximum feature value, the minimum feature value, and a preset number M; determine M feature intervals based on the minimum feature value, the maximum feature value, and the (M−1) feature quantile values; and perform initial binning on the data to be processed based on each feature value in the data to be processed and the M feature intervals to obtain M binning results, an $i^{th}$ bin including multiple pieces of feature data, feature values corresponding to the multiple pieces of feature data being in an $i^{th}$ feature interval, and i=1, 2, . . . , M.

In some embodiments, the apparatus further includes: a third obtaining module, configured to obtain a preset partition rule and a number of partitions N; a second determining module, configured to determine a partition identifier of each piece of feature data in the $i^{th}$ bin based on each object identifier in the $i^{th}$ bin and the partition rule; and a first partition module, configured to allocate each piece of feature data in the $i^{th}$ bin to an $i^{th}$ bin in the partition corresponding to the partition identifier of each piece of feature data.

In some embodiments, the first transmission module is further configured to: determine a number of feature values S in an $i^{th}$ bin, i=1, 2, . . . , M, M being the preset number, and S being a positive integer; determine R unprocessed object identifiers corresponding to a $i^{th}$ feature value randomly, R being a positive integer greater than 2, and j=1, 2, . . . , S; and determine the R unprocessed object identifiers as a target identifier set.

In some embodiments, the first receiving module is further configured to: obtain, when the set label distribution information corresponding to an $i^{th}$ bin is not preset invalid information, a number of positive samples and number of negative samples in the set label distribution information, i=1, 2, . . . , M, and M being the preset number; determine the object identifier in the target identifier set corresponding to the set label distribution information as a processed object identifier; and update the bin label distribution information corresponding to the $i^{th}$ bin based on the number of positive samples and number of negative samples in the set label distribution information until there is no unprocessed object identifier in the $i^{th}$ bin.

In some embodiments, the apparatus further includes: a deletion module, configured to delete the set label distribution information when the set label distribution information is the preset invalid information; and a third determining module, configured to determine the object identifier in the target identifier set corresponding to the set label distribution information as an unprocessed object identifier.

In some embodiments, the merging module is further configured to: merge each bin with an adjacent bin of the bin to obtain multiple candidate bins; determine candidate label attribute information of each candidate bin, the candidate label attribute information including a number of positive samples, a number of negative samples, and a percentage of positive samples; determine an information value of each candidate bin in response to determining based on the candidate label attribute information that the candidate bin satisfies a merging condition; determine a target bin based on the information value of each candidate bin; and merge each target bin with an adjacent bin of the target bin again until an optimization objective is achieved, to obtain each final bin.

In some embodiments, the apparatus further includes: a fourth obtaining module, configured to obtain each final bin in each feature dimension; a fourth determining module, configured to determine an information value of each final bin in each feature dimension and a total information value corresponding to each feature dimension; a feature selection module, configured to perform feature selection based on the information value of each final bin and each total information value to obtain multiple target final bins; and a fifth obtaining module, configured to obtain label distribution information of each target final bin, and perform modeling based on feature data in each target final bin and the label distribution information.

Here, the description of the foregoing data processing apparatus embodiment is similar to the description of the foregoing method, and has same beneficial effects as the method embodiments. A person skilled in the art should refer to the description of the method embodiment of this application for understanding of the technical details that are not disclosed in the data processing apparatus embodiment based on the federated learning of this application.

Figure 2B:
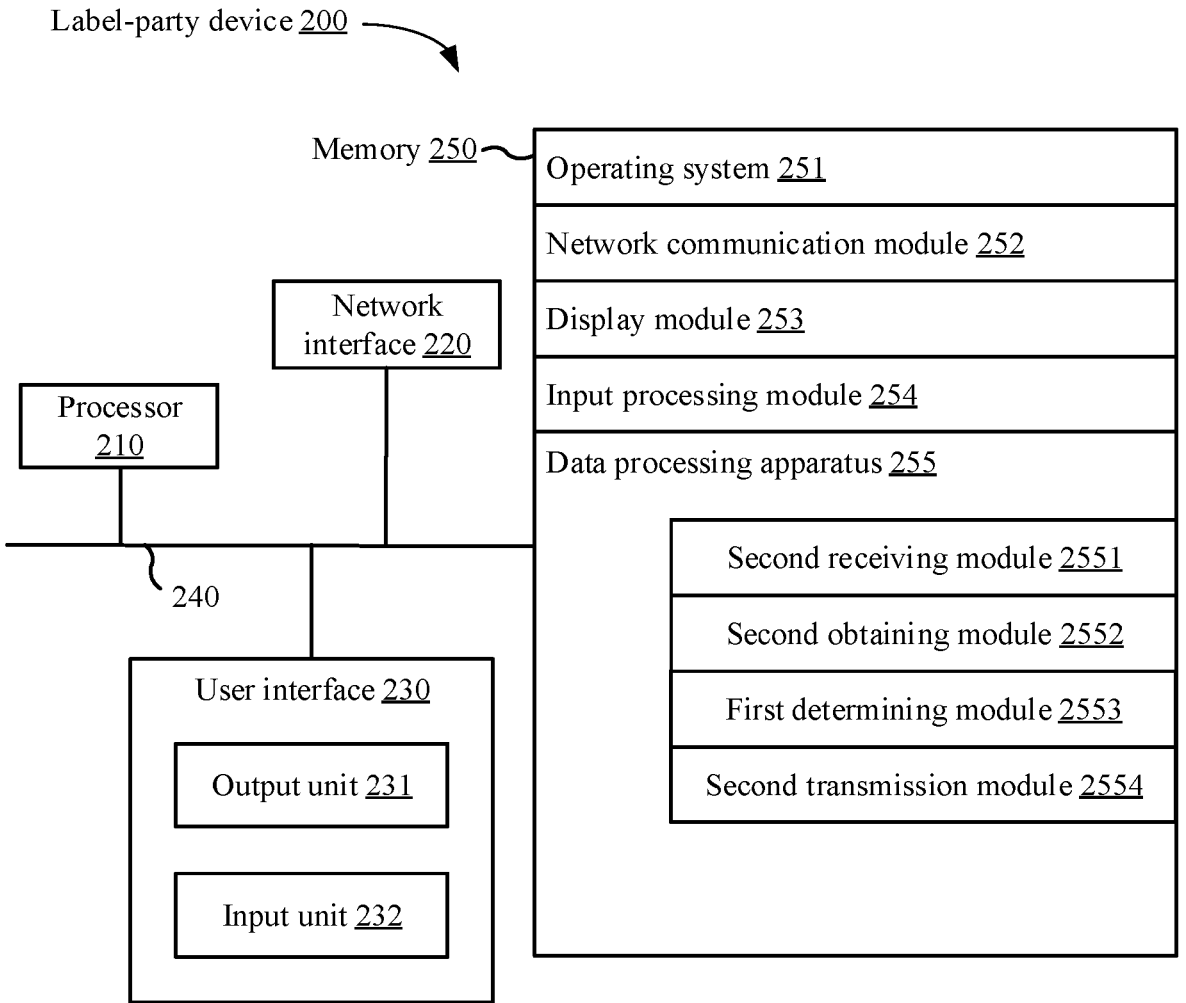
FIG. 2B is a structural diagram of a label-party device 200 according to an embodiment of this application.

FIG. 2B is a schematic structural diagram of a label-party device 200 according to an embodiment of this application. As shown in FIG. 2B, the label-party device 200 includes: at least one processor 210, a memory 250, at least one network interface 220, and a user interface 230. All the components in the label-party device 200 are coupled together by using the bus system 240. The roles and composition structures of the processor 210, the network interface 220, the user interface 230, the bus system 240, and the memory 250 may refer to the processor 410, network interface 420, user interface 430, bus system 440, and memory 450 in the feature-party device 400.

An embodiment of this application also provides a data processing apparatus 255, stored in a memory 250 of a label-party device 200. The data processing module 255 may include the following software modules:

a second receiving module 2551, configured to receive a target identifier set transmitted by a feature-party device, and obtain multiple object identifiers in the target identifier set; a second obtaining module 2552, configured to obtain label information corresponding to each object identifier; a first determining module 2553, configured to determine set label distribution information of the target identifier set based on each piece of label information; and a second transmission module 2554, configured to transmit the set label distribution information to the feature-party device.

In some embodiments, the first determining module 2553 is further configured to: determine the number of positive samples and the number of negative samples as the set label distribution information when the number of positive samples is less than a total number of object identifiers in the target identifier set and the number of negative samples is less than the total number of object identifiers.

In some embodiments, the first determining module 2553 is further configured to: determine preset invalid information as the set label distribution information of the target identifier set when the number of positive samples is equal to the total number of object identifiers in the target identifier set or the number of negative samples is equal to the total number of object identifiers.

In some embodiments, the apparatus further includes: a fifth obtaining module, configured to obtain a preset partition rule and a number of partitions N; a fifth determining module, configured to determine a partition identifier corresponding to each piece of label data based on each object identifier and the partition rule, the label data including the object identifier and the label information corresponding to the object identifier; and a second partition module, configured to add each piece of label data to the corresponding partition based on the partition identifier.

Here, the description of the foregoing data processing apparatus embodiment is similar to the description of the foregoing method, and has same beneficial effects as the method embodiments. A person skilled in the art should refer to the description of the method embodiment of this application for understanding of the technical details that are not disclosed in the data processing apparatus embodiment of this application.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing data processing method based on federated learning in the embodiments of this application.

An embodiment of this application provides a computer-readable storage medium storing an executable instruction. When the executable instruction is executed by a processor, the processor is caused to perform the method in the embodiments of this application, such as the methods shown in FIG. 3, FIG. 4, and FIG. 5.

In some embodiments, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In one embodiment, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In one embodiment, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A data processing method, applied to a feature-party device, comprising:

obtaining data to be processed, the data to be processed comprising multiple object identifiers and a feature value corresponding to each object identifier;

binning the data to be processed based on the feature value corresponding to each object identifier to obtain a number of bins;

determining multiple target identifier sets from each bin, and transmitting each target identifier set to a label-party device;

receiving each piece of set label distribution information corresponding to each target identifier set from the label-party device, and determining bin label distribution information corresponding to each bin based on each piece of set label distribution information; and merging bins based on a binning policy and each piece of bin label distribution information to obtain a final binning result.

2. The method according to claim 1, wherein the binning the data to be processed based on the feature value corresponding to each object identifier to obtain a number of bins comprises:

determining a maximum feature value and a minimum feature value based on the feature values corresponding to the object identifiers;

determining $(M-1)$ feature quantile values based on the maximum feature value, the minimum feature value, and a number M;

determining M feature intervals based on the minimum feature value, the maximum feature value, and the $(M-1)$ feature quantile values; and binning based on each feature value in the data to be processed and the M feature intervals to obtain M bins, an $i^{th}$ bin comprising multiple pieces of feature data, feature values corresponding to the multiple pieces of feature data being in an $i^{th}$ feature interval, and i=1, 2, . . . , M.

3. The method according to claim 2, further comprising:

obtaining a partition rule and a number of partitions N;

determining a partition identifier of each piece of feature data in the $i^{th}$ bin based on each object identifier in the $i^{th}$ bin and the partition rule, the partition identifier corresponding to one of N partitions; and allocating each piece of feature data in the $i^{th}$ bin to an $i^{th}$ bin in the partition corresponding to the partition identifier of each piece of feature data.

4. The method according to claim 1, wherein the determining multiple target identifier sets from each bin comprises:

determining a number of feature values S in an $i^{th}$ bin, i=1, 2, . . . , M, M being the number, and S being a positive integer;

determining R unprocessed object identifiers corresponding to a $j^{th}$ feature value randomly, R being a positive integer greater than 2, and j=1, 2, . . . , S; and determining the R unprocessed object identifiers as a target identifier set.

5. The method according to claim 1, wherein the determining bin label distribution information corresponding to each bin based on each piece of set label distribution information comprises:

obtaining, when the set label distribution information corresponding to an $i^{th}$ bin is not invalid information, a number of positive samples and number of negative samples in the set identifier distribution information, i=1, 2, . . . , M, and M being the number;

determining the object identifier in the target identifier set corresponding to the set label distribution information as a processed object identifier; and updating the bin label distribution information corresponding to the $i^{th}$ bin based on the number of positive samples and number of negative samples in the set label distribution information until there is no unprocessed object identifier in the $i^{th}$ bin.

6. The method according to claim 5, further comprising:

deleting the set label distribution information when the set label distribution information is the invalid information; and determining the object identifier in the target identifier set corresponding to the set label distribution information as an unprocessed object identifier.

7. The method according to claim 1, wherein the merging bins based on a binning policy and each piece of bin label distribution information to obtain a final binning result comprises:

merging each bin with an adjacent bin of the bin to obtain multiple candidate bins;

determining candidate label attribute information of each candidate bin, the candidate label attribute information comprising a number of positive samples, a number of negative samples, and a percentage of positive samples;

determining an information value of each candidate bin in response to determining based on the candidate label attribute information that the candidate bin satisfies a merging condition;

determining a target bin based on the information value of each candidate bin; and merging each target bin with an adjacent bin of the target bin again until an optimization objective is achieved, to obtain multiple final bins.

8. The method according to claim 1, further comprising:

obtaining each final bin in each feature dimension;

determining an information value of each final bin in each feature dimension and a total information value corresponding to each feature dimension;

performing feature selection based on the information value of each final bin and each total information value to obtain multiple target final bins; and obtaining label distribution information of each target final bin, and performing modeling based on feature data in each target final bin and the label distribution information.

9. A data processing method, applied to a label-party device, comprising:

receiving a target identifier set transmitted from a feature-party device, and obtaining multiple object identifiers in the target identifier set;

obtaining label information corresponding to each object identifier;

determining set label distribution information of the target identifier set based on each piece of label information; and transmitting the set label distribution information to the feature-party device.

10. The method according to claim 9, wherein the determining set label distribution information of the target identifier set based on each piece of label information comprises:

determining a number of positive samples and a number of negative samples based on each piece of label information; and determining the number of positive samples and the number of negative samples as the set label distribution information when the number of positive samples is less than a total number of object identifiers in the target identifier set and the number of negative samples is less than the total number of object identifiers.

11. The method according to claim 10, wherein the determining set label distribution information of the target identifier set based on each piece of label information comprises:

determining invalid information as the set label distribution information of the target identifier set when the number of positive samples is equal to the total number of object identifiers in the target identifier set or the number of negative samples is equal to the total number of object identifiers.

12. The method according to claim 9, further comprising:

obtaining a partition rule and a number of partitions N;

determining a partition identifier corresponding to each piece of label data based on each object identifier and the partition rule, the label data comprising the object identifier and the label information corresponding to the object identifier, and the partition identifier corresponding to one of N partitions; and adding each piece of label data to the corresponding partition based on the partition identifier.

13. A non-transitory computer readable storage medium, with computer instructions being stored in the computer-readable storage medium, and a processor of an electronic device reads the computer instructions from the computer-readable storage medium and executes the computer instructions, implementing a data processing method, applied to a feature-party device, comprising:

obtaining data to be processed, the data to be processed comprising multiple object identifiers and a feature value corresponding to each object identifier;

binning the data to be processed based on the feature value corresponding to each object identifier to obtain a number of bins;

determining multiple target identifier sets from each bin, and transmitting each target identifier set to a label-party device;

receiving each piece of set label distribution information corresponding to each target identifier set from the label-party device, and determining bin label distribution information corresponding to each bin based on each piece of set label distribution information; and merging bins based on a binning policy and each piece of bin label distribution information to obtain a final binning result.

14. The computer readable storage medium according to claim 13, wherein the binning the data to be processed based on the feature value corresponding to each object identifier to obtain a number of bins comprises:

determining a maximum feature value and a minimum feature value based on the feature values corresponding to the object identifiers;

determining (M−1) feature quantile values based on the maximum feature value, the minimum feature value, and a number M;

determining M feature intervals based on the minimum feature value, the maximum feature value, and the (M−1) feature quantile values; and binning based on each feature value in the data to be processed and the M feature intervals to obtain M bins, an $i^{th}$ bin comprising multiple pieces of feature data, feature values corresponding to the multiple pieces of feature data being in an $i^{th}$ feature interval, and i=1, 2, . . . , M.

15. The computer readable storage medium according to claim 14, the method further comprising:

obtaining a partition rule and a number of partitions N;

determining a partition identifier of each piece of feature data in the $i^{th}$ bin based on each object identifier in the $i^{th}$ bin and the partition rule, the partition identifier corresponding to one of N partitions; and allocating each piece of feature data in the $i^{th}$ bin to an $i^{th}$ bin in the partition corresponding to the partition identifier of each piece of feature data.

16. The computer readable storage medium according to claim 13, wherein the determining multiple target identifier sets from each bin comprises:

determining a number of feature values S in an $i^{th}$ bin, i=1, 2, . . . , M, M being the number, and S being a positive integer;

determining R unprocessed object identifiers corresponding to a $j^{th}$ feature value randomly, R being a positive integer greater than 2, and j=1, 2, . . . , S; and determining the R unprocessed object identifiers as a target identifier set.

17. The computer readable storage medium according to claim 13, wherein the determining bin label distribution information corresponding to each bin based on each piece of set label distribution information comprises:

obtaining, when the set label distribution information corresponding to an $i^{th}$ bin is not invalid information, a number of positive samples and number of negative samples in the set identifier distribution information, i=1, 2, . . . , M, and M being the number;

determining the object identifier in the target identifier set corresponding to the set label distribution information as a processed object identifier; and updating the bin label distribution information corresponding to the $i^{th}$ bin based on the number of positive samples and number of negative samples in the set label distribution information until there is no unprocessed object identifier in the $i^{th}$ bin.

18. The computer readable storage medium according to claim 17, the method further comprising:

deleting the set label distribution information when the set label distribution information is the invalid information; and determining the object identifier in the target identifier set corresponding to the set label distribution information as an unprocessed object identifier.

19. The computer readable storage medium according to claim 13, wherein the merging bins based on a binning policy and each piece of bin label distribution information to obtain a final binning result comprises:

merging each bin with an adjacent bin of the bin to obtain multiple candidate bins;

determining candidate label attribute information of each candidate bin, the candidate label attribute information comprising a number of positive samples, a number of negative samples, and a percentage of positive samples;

determining an information value of each candidate bin in response to determining based on the candidate label attribute information that the candidate bin satisfies a merging condition;

determining a target bin based on the information value of each candidate bin; and merging each target bin with an adjacent bin of the target bin again until an optimization objective is achieved, to obtain multiple final bins.

20. The computer readable storage medium according to claim 13, the method further comprising:

obtaining each final bin in each feature dimension;

determining an information value of each final bin in each feature dimension and a total information value corresponding to each feature dimension;

performing feature selection based on the information value of each final bin and each total information value to obtain multiple target final bins; and obtaining label distribution information of each target final bin, and performing modeling based on feature data in each target final bin and the label distribution information.

* * * * *